United States Patent
Lykkegaard et al.

(10) Patent No.: US 9,278,809 B2
(45) Date of Patent: Mar. 8, 2016

(54) CHUTE SYSTEM WITH ADJUSTABLE ANGLE OF INCLINATION

(71) Applicant: Crisplant A/S, Aarhus N (DK)

(72) Inventors: Uffe Lykkegaard, Aarhus C (DK); Finn Lyng Pedersen, Lystrup (DK)

(73) Assignee: Crisplant A/S, Aarhus N (DK)

( * ) Notice: Subject to any disclaimer, the term of this patent is extended or adjusted under 35 U.S.C. 154(b) by 0 days.

(21) Appl. No.: 14/367,858

(22) PCT Filed: Dec. 20, 2012

(86) PCT No.: PCT/DK2012/050483
§ 371 (c)(1),
(2) Date: Jun. 20, 2014

(87) PCT Pub. No.: WO2013/091652
PCT Pub. Date: Jun. 27, 2013

(65) Prior Publication Data
US 2015/0122611 A1 May 7, 2015

(30) Foreign Application Priority Data

Dec. 22, 2011 (DK) .................................. 2011 70751

(51) Int. Cl.
*G05B 13/00* (2006.01)
*B65G 11/12* (2006.01)
(Continued)

(52) U.S. Cl.
CPC ............... *B65G 11/123* (2013.01); *B07C 5/36* (2013.01); *B65G 11/023* (2013.01);
(Continued)

(58) Field of Classification Search
CPC ... B65B 11/123; B65B 11/023; G05B 13/021
USPC .......................................................... 700/89
See application file for complete search history.

(56) References Cited

U.S. PATENT DOCUMENTS

| 1,362,034 A | 12/1920 | Olson |
| 3,056,482 A | 10/1962 | Lanham et al. |

(Continued)

FOREIGN PATENT DOCUMENTS

| CN | 201217565 | 4/2009 |
| DE | 9300126 | 3/1993 |

(Continued)

OTHER PUBLICATIONS

International Search Report for PCT/DK2012/050483 dated Mar. 1, 2013.

*Primary Examiner* — Gene Crawford
*Assistant Examiner* — Thomas Randazzo
(74) *Attorney, Agent, or Firm* — Knobbe Martens Olson & Bear LLP

(57) ABSTRACT

The invention provides a chute system (C1,C2,C3) for a sorting system arranged for transporting objects, e.g. for use for discharging luggage from a conveyor system. The chute system has one or more chute sections with an inlet (IL) in one end and an outlet (OL) in the opposite end. Displacement means, e.g. a pneumatic actuator, is arranged to adjust an angle of inclination of the one or more chute sections (C1, C2,C3) by displacing the chute section (C1,C2,C3) in a motion comprising pivoting around a pivot point positioned downstream of the inlet (IL). E.G. the pivot point can be positioned at the outlet, e.g. by means of a hinge. The adjustment of the angle of inclination may be controlled by a processor in response to various position and/or speed sensors and/or information about incoming objects from a vision based system or from the associated sorting system, e.g. identification of poly wrapped objects. The angle of inclination can be increased in case an object stops on the chute section, or the angle of inclination can be decreased in case an object moves too fast, even if a simple gravity chute is used. A cascade of two or more chute sections (C1,C2,C3) with adjustable angles of inclination can be used to control batches of objects and to control back pressure of objects on the chute.

25 Claims, 5 Drawing Sheets

(51) Int. Cl.
  *G05B 13/02* (2006.01)
  *B65G 11/08* (2006.01)
  *B65G 47/26* (2006.01)
  *B07C 5/36* (2006.01)
  *B65G 11/02* (2006.01)
  *B65G 11/20* (2006.01)
  *B65G 47/28* (2006.01)

(52) U.S. Cl.
  CPC ............ *B65G 11/081* (2013.01); *B65G 11/203* (2013.01); *B65G 47/26* (2013.01); *B65G 47/28* (2013.01); *G05B 13/021* (2013.01)

(56) References Cited

U.S. PATENT DOCUMENTS

| | | | |
|---|---|---|---|
| 3,136,401 A | | 6/1964 | Atanasoff et al. |
| 3,589,490 A | * | 6/1971 | Walkhoff ............... B64F 1/32 193/35 R |
| 3,647,044 A | * | 3/1972 | Orstam ............... B65G 47/647 198/436 |
| 3,866,392 A | | 2/1975 | Weeks et al. |
| 4,150,743 A | | 4/1979 | Lazzarotti et al. |
| 5,123,517 A | | 6/1992 | Windau |
| 5,363,950 A | * | 11/1994 | Lacuna ............. B65G 47/1492 198/382 |
| 5,427,252 A | * | 6/1995 | Teegarden ............... B07C 5/36 209/540 |
| 5,934,438 A | | 8/1999 | Hilerich et al. |
| 6,062,119 A | * | 5/2000 | Overgaard ........... B26D 7/1818 83/165 |
| 6,095,314 A | | 8/2000 | Fortenbery |
| 6,484,869 B1 | * | 11/2002 | Brouwer ............... B66B 29/08 193/35 G |
| 6,499,582 B1 | | 12/2002 | Gillott |
| 6,640,953 B2 | | 11/2003 | Brouwer et al. |
| 6,702,121 B2 | * | 3/2004 | Linge et al. ............. 209/707 |
| 7,464,804 B2 | * | 12/2008 | Honeycutt ............... B65G 1/00 198/418.6 |
| 7,770,717 B2 | * | 8/2010 | Pedersen ............ B65G 21/2036 198/443 |
| 8,607,964 B2 | * | 12/2013 | Kheifets ............... B65G 43/08 193/21 |
| 8,642,910 B2 | * | 2/2014 | Pellenc ............... A01D 46/285 209/538 |
| 2003/0209406 A1 | * | 11/2003 | Jones ..................... B65G 47/30 198/443 |
| 2007/0237622 A1 | * | 10/2007 | Domenz ............... B65G 57/112 414/791.6 |

FOREIGN PATENT DOCUMENTS

| | | | |
|---|---|---|---|
| EP | 0947448 | | 10/1999 |
| GB | 1416035 | * | 12/1975 ............ B65G 11/12 |
| WO | WO 2010/076821 | | 7/2010 |

* cited by examiner

CHUTE SYSTEM WITH ADJUSTABLE ANGLE OF INCLINATION

CROSS REFERENCE TO RELATED APPLICATIONS

This application is a U.S. National Phase Application of PCT International Application Number PCT/DK2012/050483, filed on Dec. 20, 2012, designating the United States of America and published in the English language, which is an International Application of and claims the benefit of priority to Danish Patent Application No. PA 2011 70751, filed on Dec. 22, 2011. The disclosures of the above-referenced applications are hereby expressly incorporated by reference in their entireties.

FIELD OF THE INVENTION

The invention relates to the field of handling and sorting of objects or materials, such as luggage or parcels or the like. In particular, the invention provides a chute system with an adjustable angle of inclination for use in a sorting system.

BACKGROUND OF THE INVENTION

Chutes are used in sorting systems typically for discharging objects from a conveyor system. For example, chutes are used in luggage sorting and transporting systems in an airport, however chutes are also used for objects larger than luggage or for objects smaller than luggage. Often, a chute system is implemented using simple plates or passive rollers or the like, set up with an angle of inclination so as to allow objects to slide thereon by means of gravity. However, it is a problem with such chute systems that objects, e.g. pieces of luggage, can have significantly different surface properties. Some objects have a surface with a high stick and slip effect, e.g. poly wrapped items, that cause the objects to stop on the chute if driven only by gravity. A chute system may also just be referred to as a chute. In that a chute is a destination from which objects moved by the sorter is to be discharged into at a discharge position, an object stopped unintentionally in the chute, or an object not moving with a certain range of speed in the chute, e.g. moving too slow in the chute, may, e.g., cause unwanted recirculations in the sorting system. This is due to the chute then no longer being able to receive one or more further objects from the sorter, at least not at a given point or period of time. Thus, such further objects will, as examples, have to be directed to another chute or recirculated in the sorting system until the chute is again ready to receive objects. On the other hand, other objects may provide only a small friction with the chute and thus may obtain a rather high speed on the chute. This can cause dangerous situations at an end of the chute, if heavy objects at high speed reach areas with persons handling the objects at the end of the chute.

To avoid problems with objects having a too high speed, e.g. undriven rollers with a brake system can be used to limit the speed. To avoid problems with sticky objects stopping on the chute, a driven belt, or the like, can be used. However, such chute systems are complex and thus expensive and require additional maintenance.

SUMMARY OF THE INVENTION

Thus, according to the above description, it may be seen as an object of the present invention to provide a chute system capable of handling objects with different friction properties, and still the chute system should be possible to implement with rather simple components.

Further, it may be seen as an object to provide a chute system capable of handling batches of objects.

Still further, it may be seen as an object to provide a chute system suitable for buildings with a limited height, and still with a capacity to contain and convey many objects and/or objects with different stick/slip properties.

Preferably, the invention alleviates, mitigates or eliminates one or more of the above or other disadvantages singly or in any combination.

In a first aspect, the invention provides a chute system for a sorting system arranged for transporting objects, the chute system comprising
    at least one chute section arranged to transport objects between an inlet in one end and an outlet in the opposite end, and
    displacement means arranged to adjust an angle of inclination of the at least one chute section by displacing the at least one chute section in a motion comprising changing a vertical level of the inlet of the at least one chute section.

Such chute system is advantageous, since it is possible to handle sticky objects on a simple gravity chute which can have a rather low angle of inclination, e.g. 10-15° or even lower, during normal operation. When a sticky object, e.g. a piece of poly wrapped luggage, stops on the chute section, the displacement means can increase the vertical level of the inlet so as to increase the angle of inclination of the chute section to a point where the gravity causes the sticky objects to start moving. If an object moves too fast on a chute section, the angle of inclination can be lowered by decreasing the vertical level of the inlet to slow down the object until it reaches a preferred speed.

In cases where the outlet end of the chute system is implemented by a chute section with adjustable angle of inclination according to the first aspect, it is possible to keep the vertical level of the outlet end fixed and still allow elevating the inlet end of this chute section to adjust the angle of inclination which can speed up sticky objects. Hereby, it is possible to maintain a constant height of the end of the chute where persons need to handle objects arriving.

The chute system can be implemented by simple mechanical means requiring only few components, such as a pneumatic actuator used to increase or decrease a vertical level of the inlet, e.g. by tilting or pivoting a chute section around a pivot point, e.g. in the form of a hinge, e.g. a hinge near the outlet end of the chute section. A control system may be provided to control the actuator function, e.g. a manual control system or a control system serving to adjust the angle of inclination in response to one or more sensors capable of detecting motion and/or position of objects on the chute system.

A cascade of a plurality of chute sections with individually adjustable angles of inclination are further advantageous for controlling batches of objects. By increasing the angle of inclination of one chute section by means of increasing the vertical level of the inlet, objects can be stopped before the inlet of the chute section due to the elevated vertical level of the inlet compared to a vertical level at which the objects arrive.

In some embodiments, the displacement means are arranged to displace the at least one chute section by means of rotating the at least one chute section by means of a curved track.

In other embodiments, the displacement means are arranged to displace the at least one chute section in a motion comprising pivoting the at least one chute section around a pivot point positioned downstream of the inlet of the at least one chute section. The displacement means may be arranged to pivot the at least one chute section around a physical hinge point, or the displacement means may be arranged to perform a combined motion including pivoting the at least one chute section around a virtual pivot point. In preferred embodiments, the pivot point is positioned at least a distance of 30% of a distance between the inlet and the outlet away from the inlet, such as at least a distance of 80% of a distance between the inlet and the outlet away from the inlet. E.g. the pivot point may be positioned near or at the outlet end of the chute section. Especially, the pivot point may be positioned downstream of the outlet, and thus the displacement means may in such cases be arranged to move the chute section in a combined motion including a translation motion and a pivoting motion around a virtual pivot point positioned away from the chute section. The pivot point may be positioned below a plane formed by a surface of the at least one chute on which objects can be transported, e.g. the pivot point can be positioned immediately below said plane, such as less than 50 cm below said plane.

In one embodiment, the at least one chute section is arranged to pivot around the pivot point by means of a hinge coinciding with the pivot point, e.g. a hinge fastened to or forming part of the chute section structure. In such case, the chute section is arranged to adjust the angle of inclination by means of a simple pivoting motion. In an alternative embodiment, the at least one chute section is arranged to pivot around the pivot point by means of at least two hinges spatially arranged away from the pivot point. In such embodiment, the chute section will perform a combined translation and pivoting motion.

In preferred embodiments, the chute system comprises a control system arranged to control the displacement means, and thus arranged to control the adjustment of angle of inclination. Especially, controlling timing of the adjustment of angle of inclination, i.e. when to adjust, but possibly also controlling the amount of adjustment, the rate of adjustment, and the duration of the adjustment. Especially, the control system may be responsive to detecting means.

Such control system may be provided in order to provide and assure that all and/or a particular object obtains a speed of movement in the chute within a certain range. Additionally or alternatively, the control system may be provided for providing a certain object, which has been stopped in the chute, with a speed of movement, i.e. to start a movement of the object.

In some embodiments, the angle of inclination may be controlled by means of a user operable interface allowing a user to initiate a change in the angle of inclination of the at least one chute section, such as changing the angle of inclination from an initial value to a higher angle of inclination by pressing a button. E.g. the operator may press the button when detecting that a sticky object has stopped on the chute section, or when the operator is informed by a detecting system that an object has stopped on the chute section.

In other embodiments, a processor is arranged to determine an angle or a preferred angle of inclination by means of a control algorithm. The control system is arranged to generate an output to control the displacement means so as to adjust the angle of inclination accordingly. Thus, such embodiment forms the basis for an automatic chute system, especially when combined with one or more means of detecting motion of the objects on the chute section, e.g. including optical sensors. Especially, the control algorithm may be arranged to determine the angle of inclination in response to characteristics of one or more objects presently handled by, or to be handled by, the chute system. E.g. such information of characteristics of an object may be provided by the sorting system which the chute system is normally part of, e.g. by data available in the sorting control system, or by special data e.g. information if a piece of luggage is poly wrapped, or the information may be provided by vision systems placed on the sorting system or as part of the chute system. Especially, the characteristics of the one or more objects may be: a shape, a weight, a size, a center of gravity, an orientation, and a surface property. Such characteristics can be used, e.g. to determine whether to adjust the angle of inclination of the chute section when the object arrives at the chute section, e.g. to avoid that the object stops due to high friction.

The control algorithm may additionally or alternatively be arranged to determine the angle of inclination in response to at least one of: input from one or more sensors arranged to sense a position and/or speed of one or more objects being handled by the chute system, input from one or more vision cameras arranged to determine characeristics of one or more objects, and information from an associated sorting system about one or more objects being handled on or to be handled by the chute system. E.g. the control algorithm may be arranged to receive information from the associated sorting system of a weight of one or more objects to be handled by the chute system. Especially, the control algorithm may be arranged to determine whether to adjust the angle of inclination of the at least one chute system or not.

The control algorithm may additionally or alternatively be arranged to adjust an angle of inclination of the at least one chute section in response to a sensor input, so as to influence a speed of an object present on the at least one chute section. Especially, the control algorithm may be arranged to adjust an angle of inclination of the at least one chute section in successive increments, so as to initiate a motion of a non-moving object.

The chute system may comprise a stop structure arranged to stop an incoming object from entering the inlet of the at least one chute section. Especially, the at least one chute section may comprise a stop structure arranged in connection with the inlet end, wherein the stop structure is arranged to stop an incoming object from entering the inlet of the at least one chute section in cases where the inlet of the at least one chute section is elevated to a vertical level which is higher than a vertical level of an incoming object. Such embodiments are advantageous since they can be used to control start and stop of batches of objects.

The chute system may comprise a chute section with a fixed angle of inclination, such as upstream of and/or downstream of the at least one chute section. However, it may alternatively be preferred that all sections of the chute system have adjustable angles of inclination.

The angle of inclination may be adjustable to at least 1°, such as at least 10°, such as at least 30°, such as at least 50°, such as at least 70°. Alternatively or additionally, the angle of inclination is adjustable to at least −1°, such as at least −10°, such as at least −30°, such as at least −50°, such as at least −70°, compared to an initial angle of inclination. Especially, it is preferred that the angle of inclination can be both increased and decreased compared to an initial angle of inclination. Especially, the angle of inclination may be adjustable from an initial low value to a predetermined maximum angle of inclination value which is preferably high enough, e.g. to get sticky objects in motion after a stop on the chute section. Especially, the angle of inclination may be adjustable from an initial value to a lower angle of inclination e.g. to stop or slow down an object. E.g. the range of adjustment of the angle of inclination can be such as +/−10°, such as +/−20°, such as +/−30° or even a larger range of adjustment. The angular resolution of the adjustment may be such as +/−1°, such as +/−2°, such as +/−5°, such as 10+/−10°, or the adjustment may be performed in one large step from one angle of inclination to another higher or lower angle of inclination.

The at least one chute section may be implemented by a large variety of chute types. For example, the at least one chute section may comprise: undriven rollers, a roller table, a ball transfer table, a driven belt, a non-driven belt, a plurality of wheels, a wodden plate, a plate of a synthetic material, and a metal plate. Thus, even though the chute system according to the invention is advantageous for use with simple gravity chutes, it is to be understood that driven chute sections can also be included, e.g. driven belts. In other embodiments, all sections of the chute system are implemented as gravity chutes.

The angle of inclination of the at least one chute section is adjustable around the pivot point by means of one of: a pneumatically driven actuator, an electrically driven actuator, an electric motor, a servo motor, and a manually or automatically operated lever. However, it is to be understood that many other types of actuators can be used, depending on the actual application and size of the chute section. The actuator may drive the motion of the chute section by means of gear wheels, belts or the like.

The chute system may comprise a second chute section arranged to transport objects between an inlet in one end and an outlet in the opposite end, and displacement means arranged to adjust an angle of inclination of the second chute section by displacing the second chute section in a motion comprising changing a vertical level of the inlet of the second chute section. Especially, the at least one chute section and the second chute section may be arranged in relation to each other so as to transport objects from the outlet of the at least one chute section to the inlet of the second chute section. More specifically, the outlet of the at least one chute section may be directly connected to the inlet of the second chute section. Embodiments with two or more adjustable chute sections are advantageous, since they can be controlled so as to control several batches of objects. Especially, it may be preferred that the entire transport path between inlet and outlet of the chute system is formed by independently adjustable chute sections, thus enabling a rather low general angle of inclination, since it is possible to get stopped objects into motion by increasing the angle of inclination at any position on the transport path of the chute system.

The chute system may comprise a third chute section arranged to transport objects between an inlet in one end and an outlet in the opposite end, and displacement means arranged to adjust an angle of inclination of the third chute section by displacing the third chute section in a motion comprising changing a vertical level of the inlet of the third chute section. Especially, the at least one, the second and the third chute sections are arranged in a cascade configuration.

It is to be understood that the chute system may comprise four or even more cascaded chute sections with independently controlled adjustable angles of inclination.

It is to be understood that a length and width of the at least one chute section should preferably be matched to the type and size of objects to be transported. The chute system is advantageous for a large variety of objects of different size, e.g. large objects such as big suitcases, or big postal packages, but also small objects such as postal parcels and flats and/or small parcels and/or hand luggage like objects.

In a second aspect, the invention provides a sorting system for sorting objects, the sorting system comprising a sorter, and
a plurality of discharge positions, wherein the sorting system comprises a chute system according to the first aspect arranged at one or more of the plurality of discharge positions.

Especially, the sorting system may have a plurality of discharge positions, wherein the sorting system comprises a plurality of chute systems according to the first aspect arranged to receive objects at respective discharge positions. Such plurality of chute systems may be arranged at the same vertical level, or at different vertical levels, such as two chute systems placed at the same horizontal position, but placed vertically above each other.

It is to be understood that the sorter may be of a type as for example: a tilt-tray sorter, a cross-belt sorter, a tote based sorter, a pusher sorter, or a shoe sorter. The sorter may be combined with different other types of equipment, such as one or more tracks leading to the sorter and/or leading or inducting objects onto the sorter, so called inductions, and/or other types of conveyors. A sorter is very often a device forming an endless loop, thus allowing for recirculations of objects in the device.

According to an embodimnet of the invention, the sorter is provided for sorting one or more objects according to which destination among a number of destinations, at a number of discharge positions, the object is to be discharged into from the sorter.

Furthermore, such sorting system typically comprises at least one track leading objects to the sorter, i.e. an induction. An induction is a kind of loading system for loading objects onto the sorter.

According to an embodiment of the invention, the sorter is provided for moving the objects towards discharge positions. A first direction of movement of the objects in or on the sorter, at the discharge positions, is perpendicular or substantially perpendicular to a second direction of movement of the objects in which the objects are supposed to be moved in the chute system.

The chute is a device configured for receiving objects being discharged into it. The objects are typically discharged into the chute at an angle which is perpendicular or substantially perpendicular to the direction in which the objects where moving on the sorter. The chute is a device arranged to buffer objects being discharged from the sorter, prior to further handling. Thus the chute may comprise sideguards, such as plates or sides of wood or steel, keeping the objects in the chute and guiding the objects in a movement towards the outlet end of the chute.

In typical configurations, a chute comprises at least one chute section being arranged perpendicularly to the sorter. Such chute section of such chute system and sorting system may be provided with displacement means arranged in accordance with the invention and the embodiments of the invention disclosed herein.

In a third aspect, the invention provides a method of operating a chute system comprising at least one chute section with an inlet in one end and an outlet in the opposite end, the method comprising displacing the at least one chute section in a motion comprising changing a vertical level of the inlet of the at least one chute section so as to adjust an angle of inclination of the at least one chute section. In some embodiments, the method comprises adjusting the angle of inclination in successive increments, so as to initiate a motion of a non-moving object. In some embodiments, the method comprises stopping an object arriving to the inlet of the at least one chute section by pivoting the at least one chute section to obtain an angle of inclination so as to change the vertical level of the inlet of the at least one chute section to a level exceeding a level at which the object arrives to the inlet. Especially, the method comprises operating the chute system according to any of the embodiments of the first aspect.

It is appreciated that the same advantages and embodiments described for the first aspect apply as well for the second and third aspects. Further, it is appreciated that the described embodiments can be intermixed in any way between the mentioned aspects.

BRIEF DESCRIPTION OF THE FIGURES

The invention will now be described in more detail with reference to embodiments and regard to the accompanying figures of such embodiments, of which

The figures illustrate specific ways of implementing the present invention and are not to be construed as being limiting to other possible embodiments falling within the scope of the attached claim set.

DETAILED DESCRIPTION OF EMBODIMENTS

Figure 1:
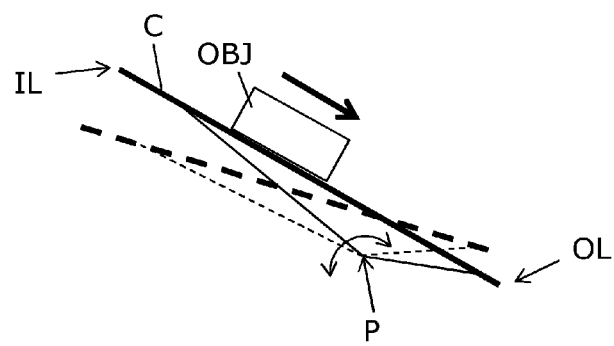
FIG. 1 illustrates a sketch of a chute system with a chute section pivotably hinged so as to adjust its angle of inclination.

FIG. 1 illustrates a side view sketch of a chute section embodiment in the form of a simple gravity chute with a planar chute surface C on which an object OBJ can slide from an inlet IL to an outlet OL in the direction indicated by the arrow. The chute surface C is connected to a structure which is hinged so as to allow pivoting around a pivot point P downstream of the inlet IL, thereby adjusting or changing the angle of inclination of the chute surface C. The dashed lines indicates the chute structure displaced by pivoting around the pivot point P into a position with a smaller angle of inclination. This is one way of providing a displacement of the inlet IL of the chute with respect to its vertical level. It is seen that the inlet IL of the solid version of the chute is at a higher vertical level than the inlet of the dotted version of the chute.

Displacement means (not shown) preferably comprising an actuator, is used to displace the chute structure between one angle of inclination to another angle of inclination, e.g. with the aim to control the speed of the object OBJ when sliding on the chute surface C.

In the sketch of FIG. 1, the pivot point P is positioned below the chute surface C and near the outlet end OL of the chute surface C. However, in principle, the pivot point P may be positioned above the chute surface C, and/or nearer to the inlet IL or nearer to the outlet OL than illustrated. Especially, it may be preferred to position the pivot point P near the outlet OL, such as by a hinge positioned directly below the outlet end OL of the chute surface C.

Figure 2:
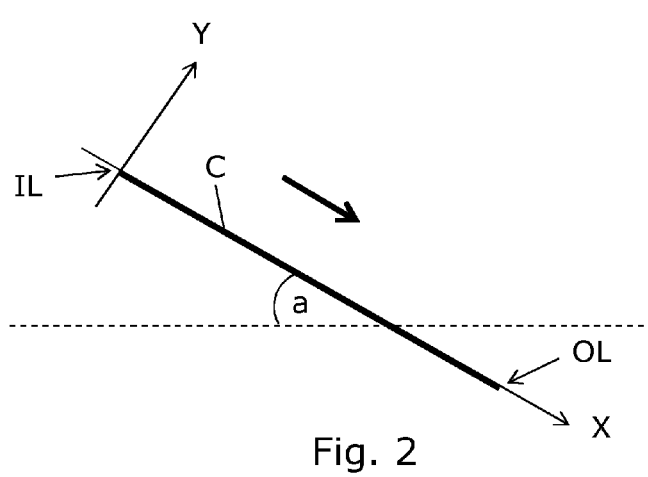
FIG. 2 illustrates a sketch of a chute section with a definition of angle of inclination.

FIG. 2 illustrates a side view sketch of a planar chute section C with an inlet end IL and an outlet end OL. A coordinate system X, Y is shown, where the X-axis coincides with the chute surface C, and where the Y-axis is perpendicular thereto, and with the origo of the coordinate system coinciding with the inlet IL. An angle of inclination 'a' is defined as the angle between horizontal (shown as a dashed line) and the x-axis. The pivot point (not shown) is preferably positioned downstream of the inlet IL thus corresponding to a position of the pivot point at positive X-values and in principle at positive or negative Y-values. Preferable positions are at negative Y-values and at X-values corresponding to at least 30% of a distance between the inlet IL and the outlet OL.

With the angle of inclination definition, positive angle values 'a' correspond to an angle of inclination where gravity will influence an object on the chute surface C in a direction towards the outlet OL. Negative angle values 'a' correspond to the opposite direction of gravity on an object on the chute surface C.

Figures 3A, 3B:
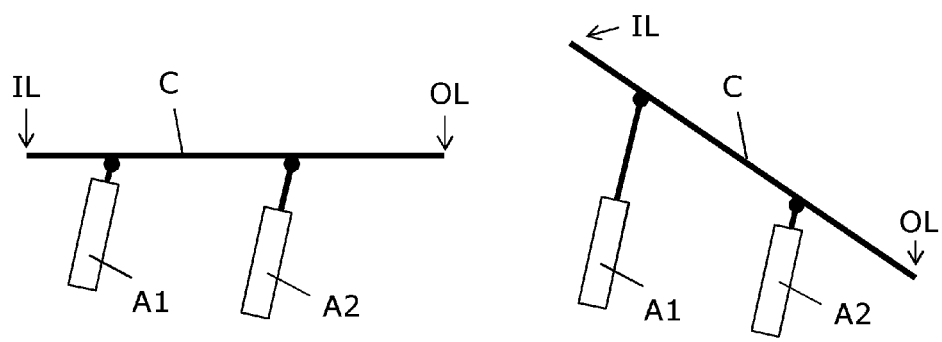
FIGS. 3a and 3b illustrate a chute section embodiment which is displaced in a combined translation and pivoting motion to adjust its angle of inclination.

FIGS. 3a and 3b show side view sketches of a chute section embodiment displaced differently so as to obtain different angles of inclination. FIG. 3a shows a planar chute surface C with an inlet IL and an outlet OL at approximately the same vertical level, i.e. at an angle of inclination of 0°. FIG. 3b shows the same chute surface C but displaced by means of the two actuators A1, A2, e.g. pneumatic cylinder actuators, which are connected to the chute structure by means of two hinges. The two actuators A1, A2 are operated such that the chute structure and thus the chute surface C is displaced in a combined motion including both a translation component and a pivoting component such that the inlet IL is displaced with respect to vertical level, and thus obtaining the effect that the chute surface C has been adjusted with respect to its angle of inclination. In FIG. 3b the angle of inclination has been adjusted to an angle of inclination of about 45°. As seen, this adjustment of angle of inclination is obtained by a combined motion such that the vertical level of the inlet IL is increased, while the vertical level of the outlet OL is decreased. This can be advantageous in applications where a high angle of inclination is required of a large chute section, where, at the same time, a limited total height is available for the chute system.

FIGS. 4-10 illustrate side view sketches of different configurations of chute systems where at least one chute section with adjustable angle of inclination with a pivot point downstream of its inlet is included. In all examples, a discharge position DS delivers objects to the chute system inlet IL at one height, while a person receives the objects in the outlet OL of the chute system at a lower height.

Figure 4:
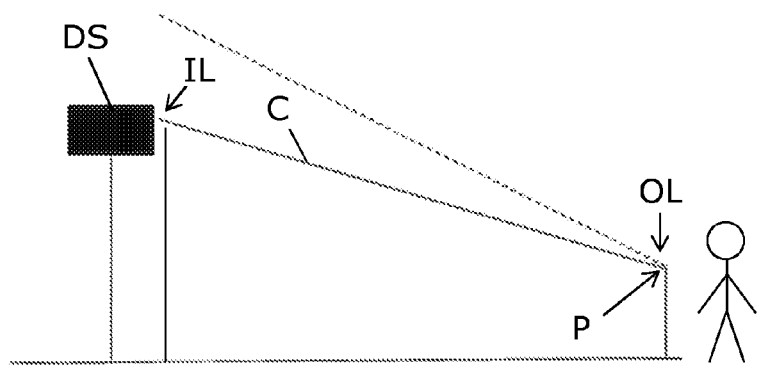
FIGS. 4-10 illustrate sketches of different examples of chute system configurations with one, two, and three sections of which up to two sections have adjustable angles of inclination.

FIG. 4 shows a simple embodiment where the chute system has one chute section C hinged to pivot around a pivot point P at or at least near the outlet OL. The solid line indicates the chute C in a "normal" position at one angle of inclination where the chute C is arranged to receive objects at its inlet IL. The dashed line indicates an elevated position, i.e. a higher angle of inclination, e.g. for speeding up or initiating a motion of one or more objects on the chute C.

Figure 5:
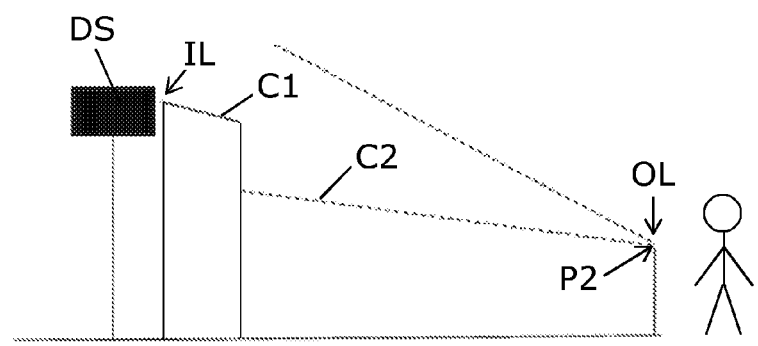

FIG. 5 illustrates a version of the configuration of FIG. 4 where a first chute section C1 with a fixed angle of inclination forms an inlet chute, and where a second chute section C2 has an adjustable angle of inclination indicated by the two dashed lines. The second chute section is hinged so as to pivot around pivot point P2 positioned as shown in FIG. 5.

Figure 6:
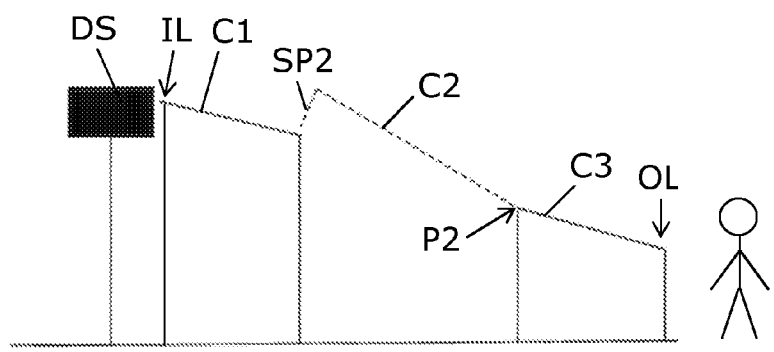

FIG. 6 illustrates the same principle as in FIG. 5, where a first chute section C1 has a fixed angle of inclination, a second chute section C2 being hinged to allow adjustment of its angle of inclination by pivoting around pivot point P2 positioned at the end of the second chute section C2. A third chute section C3 with a fixed angle of inclination follows downstream of C2, and the end of this third chute section C3 forms the outlet OL of the chute system. The second chute section C2 is seen to be supplied with a stop plate SP2 which, when elevated to a vertical level above the end of the first chute section C1, is capable of stopping objects arriving to the inlet end of the second chute section C2.

Figure 7:
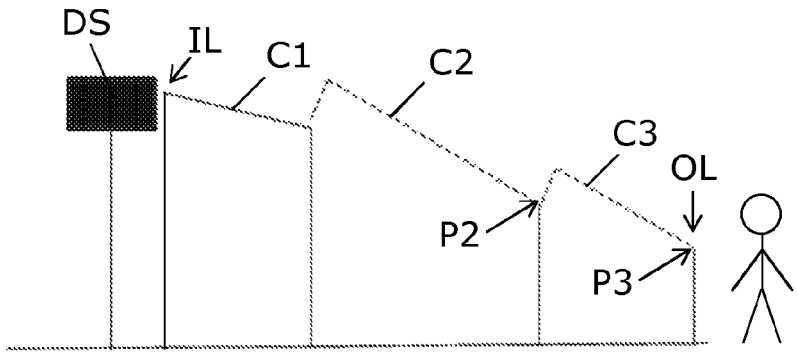

FIG. 7 shows the configuration of FIG. 6 but where the third chute section C3 is replaced by one with an adjustable angle of inclination, since it is hinged to pivot around pivot point P3 at the outlet end of the third chute section C3. The inlet of the chute section C3 is also supplied with a stop plate as the second chute section C2. The stop plates can be mounted on the inlet end of the chute structure, or they can be e.g. one or more plates or other structures mounted on C2 or on another structure, and can be operated by an actuator and elevated to stop objects at the end of the preceding chute section, when the angle of inclination of the adjustable chute section is adjusted such that a vertical level of the inlet is higher than the vertical level of the outlet of the preceding chute section. It may additionally be preferred also to stop objects in case the vertical level of the inlet is lower, or at least significantly lower, than the vertical level of the outlet of the preceding chute section. Such stop function, e.g. implemented by plates, can be operated to control batches of objects. In case the angle of inclination of C2 is decreased, a stop plate or other activatable stop structure will be required to stop objects from falling off C1.

Figure 8:
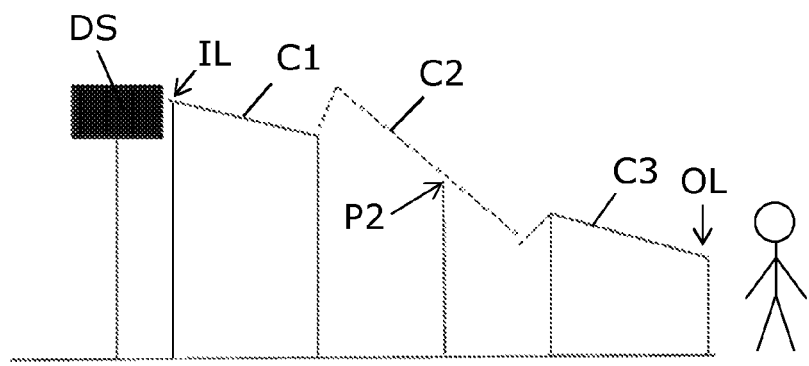

FIG. 8 illustrates the version of FIG. 6 but modified with respect to the pivot point P2 which is here illustrated as positioned halfway between inlet and outlet of the adjustable second chute section C2. As seen, stop plates are arranged to control objects at both inlet and outlet ends of the second chute section C2 when it is adjusted to an angle of inclination such as e.g. to control back pressure and/or avoid items falling off the chute.

Figure 9:
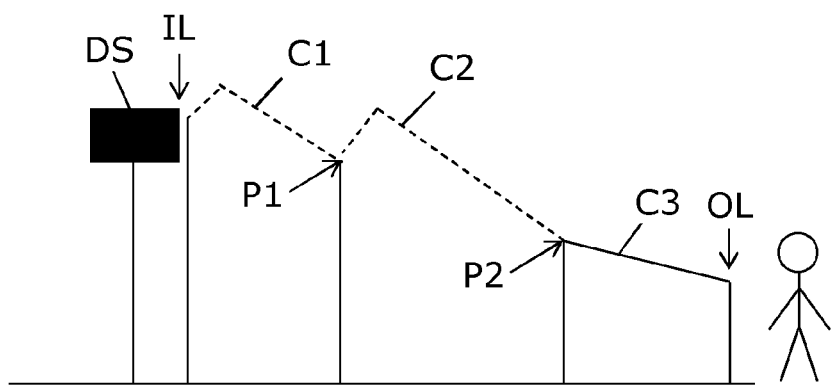

FIG. 9 illustrates the version of FIG. 6 but modified with respect to the first chute section which is here adjustable with respect to its angle of inclination, since it is hinged to pivot around a pivot point P1 positioned at its outlet end. The first and second chute sections C1, C2 are supplied with a stop function implemented by plates at their inlet ends. Especially, the first chute section C1 may be arranged to distribute objects to two second chute sections C2 positioned at the same vertical level but at different horizontal positions, which again transport objects to respective two third chute sections C3 positioned at the same vertical level but at different horizontal positions. Alternatively, the two second chute sections C2 may be positioned at the same horizontal position, but at different vertical levels, and the two third chute sections C3 may also be positioned at the same horizontal position, but at different vertical levels.

Figure 10:
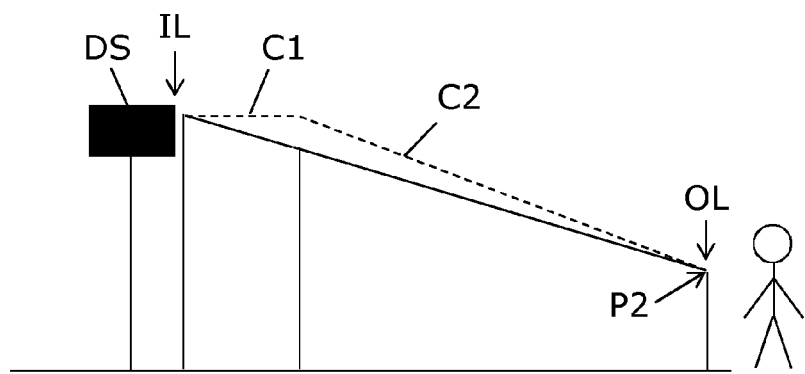

FIG. 10 illustrates an alternative version of the embodiment shown in FIG. 5, where the fixed chute section C1 of FIG. 5 is replaced by a chute inlet section C1 which has an outlet end connected to follow the vertical level of the inlet of the adjustable second chute section C2. With such embodiment, it is still possible to receive objects at the inlet of the first chute section C1, while the second chute section C2 is at an elevated position with an increased angle of inclination.

It is to be understood that all of the chute sections C1-C3 in the embodiments of FIGS. 4-10 can be implemented with any kind of chutes or combination of chutes, such as undriven rollers, ball transfer tables, driven belts, and plates etc.

Figure 11:
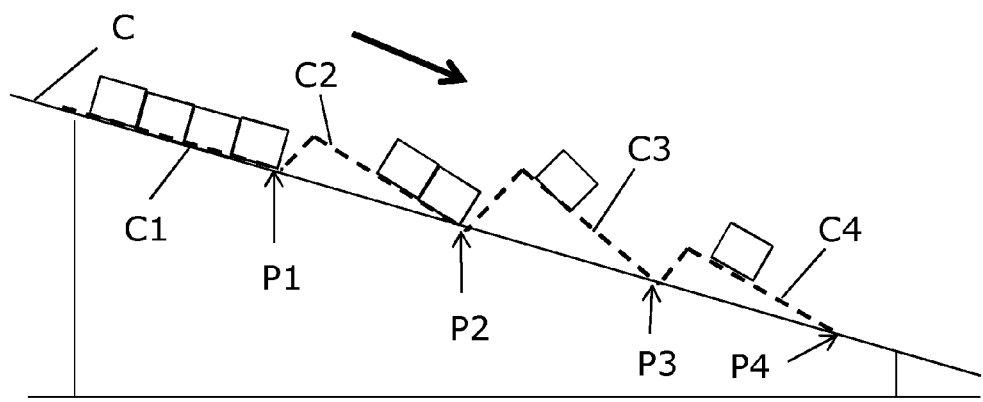
FIG. 11 illustrates a chute system embodiment with a cascade of four chute sections with adjustable angles of inclination.

FIG. 11 illustrates a side view sketch of a chute system with a chute C having a fixed angle of inclination and arranged to transport objects in the direction of the arrow. A cascade of four chute sections C1-C4 are indicated with dashed lines to be mounted so as to be able to pivot around respective pivot points P1-P4 positioned at their respective outlet ends. The first chute section C1 is shown at a not elevated position, i.e. with an angle of inclination similar to the angle of inclination of the general chute C. The three other chute sections C2-C4 are shown at elevated positions relative to the general chute C.

A number of objects are shown at different positions on the four chute sections C1-C4, and as seen, operation of the chute sections C1-C4 with respect to their angle of elevation allows control of batches of objects, e.g. to allow control of the timing of objects arriving at the end of the last chute section C4. Four objects are stopped on C1 due to the elevation of C2, while two objects are stopped on C2 due to elevation of C3 which at the same time is getting an object to move by means of the high angle of inclination. Also the fourth chute section C4 is elevated to speed up motion of an object positioned thereon. Hereby, also back pressure of objects in the chute system can be controlled.

Figure 12:
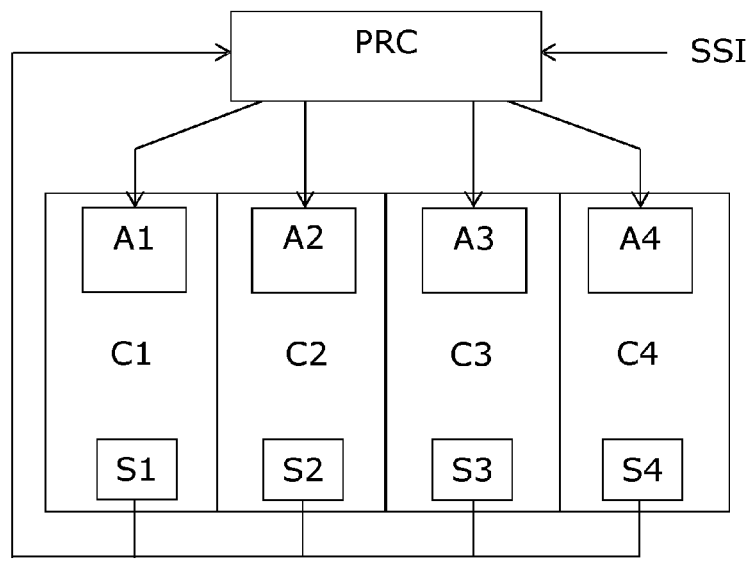
FIG. 12 illustrates a block diagram sketching basic elements in an example of a control system for controlling angle of inclination of four chute sections.

FIG. 12 illustrates a block diagram showing elements of a control system for controlling four chute sections C1-C4 with individually adjustable angles of inclination. Each of the chute sections C1-C4 includes respective individually controllable actuators A1-A4, which are controlled by a controller in the form of a processor PRC so as to adjust the angle of inclination of the chute sections C1-C4. The processor PRC executes a control algorithm which calculates and generates electric control signals to each of the individual actuators A1-A4 in response to position signals in the form of outputs from position sensors S1-S4 arranged on or near each of the chute sections C1-C4 to sense the presence and/or speed of an object on the chute section C1-C4, e.g. the position sensors S1-S4 may be based on optical sensors, vision cameras or other types of sensors. Alternatively or additionally, a weight, a shape, an orientation of the object, a surface property or center of gravity can be sensed and provided as input to the processor PRC. Especially, if an object moves too slowly or even stops, the angle of inclination can be increased, while the angle of inclination can be decreased, in case an object moves too fast.

As illustrated, the processor PRC may additionally or alternatively receive data in the form of information SSI from the associated sorting system e.g. regarding characteristics of arriving objects prior to arriving at the chute system including chute sections C1-C4. E.g. such information SSI can include data regarding surface properties, sizes or other characteristics. Hereby, the control algorithm in the processor PRC can determine an appropriate angle of inclination of the chute sections C1-C4 in response to the mentioned information SSI about an incoming object. E.g. the information may include identification of poly wrapped objects which are known to be sticky, and thus the angle of inclination can be increased when such objects arrive to the chute sections C1-C4 so as to avoid the poly wrapped object from unintentionally stopping on the chute. Hereby, a high capacity of the chute system is provided.

In a practical implementation, each of the tilting actuators A1-A4 may have an individual controller, such as especially in case of the actuator being a servo motor or a pneumatic actuator. These individual controllers may then be connected to a field bus which is controlled by the control algorithm serving to control the tilting angle strategy, and thus the control algorithm is preferably implemented in software.

In general, the processor PRC may be partly or fully implemented as part of a control system of an associated sorting system. In a sorting system where several chute systems are connected, the major part of the processor function may be executed by the main control system, while only a minimal processing power is necessary in each of the connected chute systems, such as in the form of a simple Programmable Logic Controller (PLC) or the like.

In case an object stops on a chute section, the control algorithm may be arranged to increment the angle of inclination successively until the sensors S1-S4 provide feedback to the control algorithm, that the object has started moving due to gravity. Further, the control algorithm may be arranged to handle control of batches of objects, i.e. use the actuators A1-A4 to adjust the angle of inclination of the chute sections C1-C4 so as to stop batches of objects according to a predetermined strategy and/or an input from an operator of the chute system. Further, it is hereby possible to control back pressure between objects buffered in the chute system.

It is understood that the function of the control system, here illustrated as a processor PRC, can be implemented in various ways. Preferably, the controller is a computerized controller including a digital processor executing a control algorithm which is implemented in software, so as to allow easy updating and adaptation of the function of the chute system. In some embodiments, the processor system PRC is implemented by means of a Programmable Logic Controller (PLC). As mentioned, part of the control algorithm may be implemented as part of the sorting system controller which has already at least some information about the objects to be handled.

The electric control signals generated by the processor system PRC, so as to individually control adjustment of the angle of inclination of each of the chute sections C1-C4, can have various forms depending on the type of actuator A1-A4 used and depending on the angular resolution of adjustment provided. The control signals can be in the form of a digital or analog electric signals. In some embodiments, the angle of inclination can only be adjusted between two angle values, e.g. a normal rather low angle of inclination, and an increased angle of inclination value higher than the normal angle so as to increase speed and/or initiate motion of one or more objects. E.g. a third angle value may be included, e.g. a decreased angle of inclination lower than the normal angle so as to decrease speed of objects. In other embodiments, the angular resolution of the angle of inclination can be controlled with an angular resolution of at least 10°, such as 5°, such as 2°, such as 1°, or even smaller. The range of possible angles of inclination depends on the actual applications, but in preferred embodiments, the angle of inclination is adjustable within an interval of 0° to 40°, such as 0° to 70°. For some applications, it may be preferred that the lowest possible angle of inclination is such as 5°-20° or 10°-20° in order to always provide a certain amount of gravity drive on the objects on the chute. A high angular resolution of the electric control signal and actuators A1-A4 will provide the possibility of precisely controlling the speed and/or back pressure of objects on the chute section.

Figure 13:
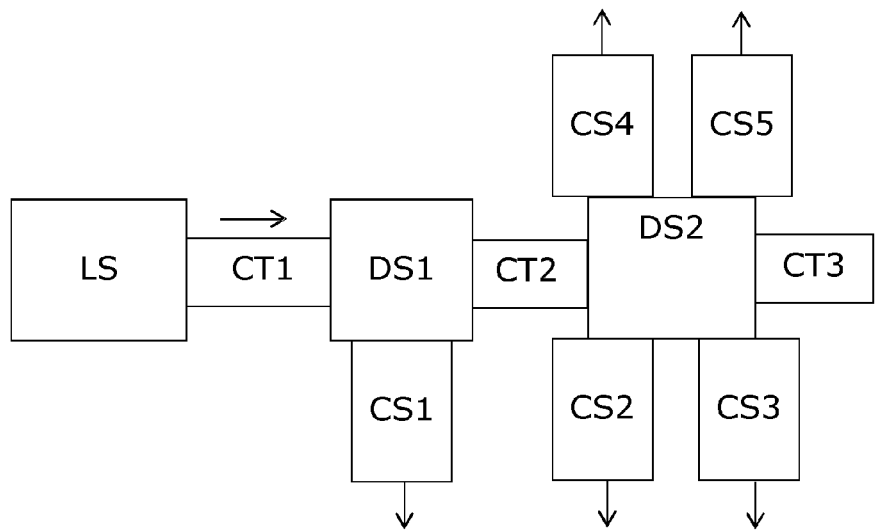
FIG. 13 illustrates a block diagram of a sorting system embodiment comprising five chute systems.

FIG. 13 illustrates a sketch of a sorting system embodiment, such as for sorting luggage. At a load station LS, pieces of luggage are loaded onto a conveyor track CT1 which transports the pieces of luggage to a first discharge position DS1 where pieces of luggage can be discharged. E.g. the luggage can be carried on totes driven forward on the conveyor track. At the discharge position DS1, the luggage can either pass or be discharged from the conveyor track and thus arrive at an inlet of a first chute system CS1. A further conveyor track CT2 transports luggage further to a second discharge position DS2 which is capable of discharging pieces of luggage to four different chute systems CS2, CS3, CS4, CS5. Finally, a conveyor track CT3 transports luggage not yet discharged away from the discharge position DS2.

The chute system CS1 is illustrated as spatially distributed in a horizontal plane, but in some sorting systems, chute systems may as well be placed at different vertical positions, such as two or more chute systems being placed above each other.

It is to be understood that the chute systems CS1-CS5 are individually controlled, and each of the chute systems CS1-CS5 may include only one or a cascade of a plurality of chute sections with adjustable angle of inclination. As mentioned, in case the chute systems CS1-CS5 are implemented as pure gravity chutes, the invention is advantageous, since the adjustable angle of inclination will help to maintain a desired flow of luggage on the chute systems CS1-CS5. Dangerous situations can be avoided where luggage arrives at high speed at the end of the chute where persons manually handle the luggage. Further, the chute system of the invention can solve the known problem of handling poly wrapped luggage on gravity chutes often causing unintentional stops which may require manual interference and at least reduces the capacity of such chutes.

To sum up: the invention provides a chute system for a sorting system arranged for transporting objects, e.g. for use for discharging luggage from a conveyor system. The chute system has one or more chute sections with an inlet in one end and an outlet in the opposite end. Displacement means, e.g. a pneumatic actuator, is arranged to adjust an angle of inclination of the one or more chute sections by displacing the chute section in a motion comprising pivoting around a pivot point positioned downstream of the inlet. E.g. the pivot point can be positioned at the outlet, e.g. by means of a hinge. The adjustment of the angle of inclination may be controlled by a processor in response to various position and/or speed sensors and/or information about incoming objects from a vision based system or from the control system of an associated sorting system, e.g. identification of poly wrapped objects. The angle of inclination can be increased in case an object stops on the chute section, or the angle of inclination can be decreased in case an object moves too fast even if a simple gravity chute is used. A cascade of two or more chute sections with adjustable angles of inclination can be used to control batches of objects and to control back pressure of objects on the chute.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A chute system for a sorting system arranged for transporting objects, the chute system comprising:

at least one chute section arranged to transport objects between an inlet in one end and an outlet in the opposite end;
an actuator arranged to adjust an angle of inclination of the at least one chute section by displacing the at least one chute section in a motion comprising changing a vertical level of the inlet of the at least one chute section;
a control system arranged to control the actuator; and
a processor arranged to determine an angle of inclination using a control algorithm, wherein the control system is arranged to generate an output to control the actuator so as to adjust the angle of inclination accordingly.

2. The chute system according to claim 1, wherein the actuator is arranged to displace the at least one chute section by rotating the at least one chute section with a curved track.

3. The chute system according to claim 1, wherein the angle of inclination is controlled by a user operable interface allowing a user to initiate a change in the angle of inclination of the at least one chute section.

4. The chute system according to claim 1, wherein the control algorithm is arranged to determine the angle of inclination in response to at least one of: input from one or more sensors arranged to sense a position and/or speed of one or more objects being handled by the chute system, input from one or more vision cameras arranged to determine characeristics of one or more objects, and information from an associated sorting system about one or more objects to be handled by the chute system.

5. The chute system according to claim 1, wherein the control algorithm is arranged to determine whether to adjust the angle of inclination of the at least one chute section or not.

6. The chute system according to claim 1, wherein the at least one chute section comprises a stop structure arranged in connection with the inlet end, wherein the stop structure is arranged to stop an incoming object from entering the inlet of the at least one chute section in cases where the inlet of the at least one chute section is elevated to a vertical level, which is higher or lower than a vertical level of an incoming object.

7. The chute system according to claim 1, wherein the at least one chute section comprises at least one of: undriven rollers, a roller table, a ball transfer table, a driven belt, a non-driven belt, a plurality of wheels, a wodden plate, a plate of a synthetic material, or a metal plate.

8. The chute system according to claim 1, wherein the angle of inclination of the at least one chute section is adjustable by a pneumatically driven actuator, an electrically driven actuator, an electric motor, a servo motor, or a manually or automatically operated lever.

9. The chute system according to claim 1, wherein the control algorithm is arranged to determine the angle of inclination in response to characteristics of one or more objects presently handled by, or to be handled by, the chute system.

10. The chute system according to claim 9, wherein the characteristics of the one or more objects comprises at least one of: a shape, a weight, a size, a center of gravity, an orientation, or a surface property.

11. The chute system according to claim 1, wherein the control algorithm is arranged to adjust an angle of inclination of the at least one chute section in response to a sensor input, so as to influence a speed of an object present on the at least one chute section.

12. The chute system according to claim 11, wherein the control algorithm is arranged to adjust an angle of inclination of the at least one chute section in successive increments, so as to initiate a motion of a non-moving object.

13. The chute system according to claim 1, wherein the actuator is arranged to displace the at least one chute section in a motion comprising pivoting the at least one chute section around a pivot point positioned downstream of the inlet of the at least one chute section.

14. The chute system according to claim 13, wherein the pivot point is positioned downstream of the outlet.

15. The chute system according to claim 13, wherein the pivot point is positioned below a plane formed by a surface of the at least one chute on which objects can be transported.

16. The chute system according to claim 1, comprising a second chute section arranged to transport objects between an inlet in one end and an outlet in the opposite end, and an actuator arranged to adjust an angle of inclination of the second chute section by displacing the second chute section in a motion comprising changing a vertical level of the inlet of the second chute section.

17. The chute system according to claim 16, comprising a third chute section arranged to transport objects between an inlet in one end and an outlet in the opposite end, and an actuator arranged to adjust an angle of inclination of the third chute section by displacing the third chute section in a motion comprising changing a vertical level of the inlet of the third chute section.

18. The chute system according to claim 17, wherein the at least one, the second and the third chute sections are arranged in a cascade configuration.

19. A sorting system for sorting objects, the sorting system comprising:
a sorter with a plurality of discharge positions, wherein the sorting system comprises a chute system according to claim 1 arranged at one or more of the plurality of discharge positions.

20. The sorting system according to claim 19, wherein the sorter is provided for sorting one or more objects in response to which of a number of destinations at a number of discharge positions, the object is to be discharged from the sorter, and wherein the sorting system further comprises at least one track leading objects to the sorter.

21. The sorting system according to claim 20, wherein the sorter comprises a conveyor or a chain moving one or more trays or belts or a conveyor moving totes with objects, which sorter is receiving the objects from the tracks leading to the sorter and moving the objects towards the discharge positions, and where a first direction of movement of the objects in or on the sorter at the discharge positions is perpendicular or substantially perpendicular to a second direction of movement of the objects in which the objects are transported in the chute system.

22. A method of operating a chute system comprising at least one chute section with an inlet in one end and an outlet in the opposite end, the method comprising:
displacing the at least one chute section in a motion comprising changing a vertical level of the inlet of the at least one chute section so as to adjust an angle of inclination of the at least one chute section;
controlling an actuator to perform the displacing;
determining the angle of inclination using a control algorithm; and
generating an output to control the actuator so as to adjust the angle of inclination accordingly.

23. The method according to claim 22, further comprising adjusting the angle of inclination in successive increments, so as to initiate a motion of a non-moving object by means of gravity.

24. The method according to claim 22, further comprising:
stopping an object arriving to the inlet of the at least one chute section by displacing the at least one chute section to obtain an angle of inclination so as to increase a vertical level of the inlet of the at least one chute section to a level exceeding a level at which the object arrives to the inlet.

25. The method according to claim 22, wherein the chute system comprises a chute system according to claim 1.

* * * * *